April 5, 1960
C. E. JOHNSON ET AL
2,931,263
METHOD OF CUTTING ALUMINUM INCLUDING THE
STEP OF HEATING TO A WHITE HEAT
Filed Oct. 11, 1956
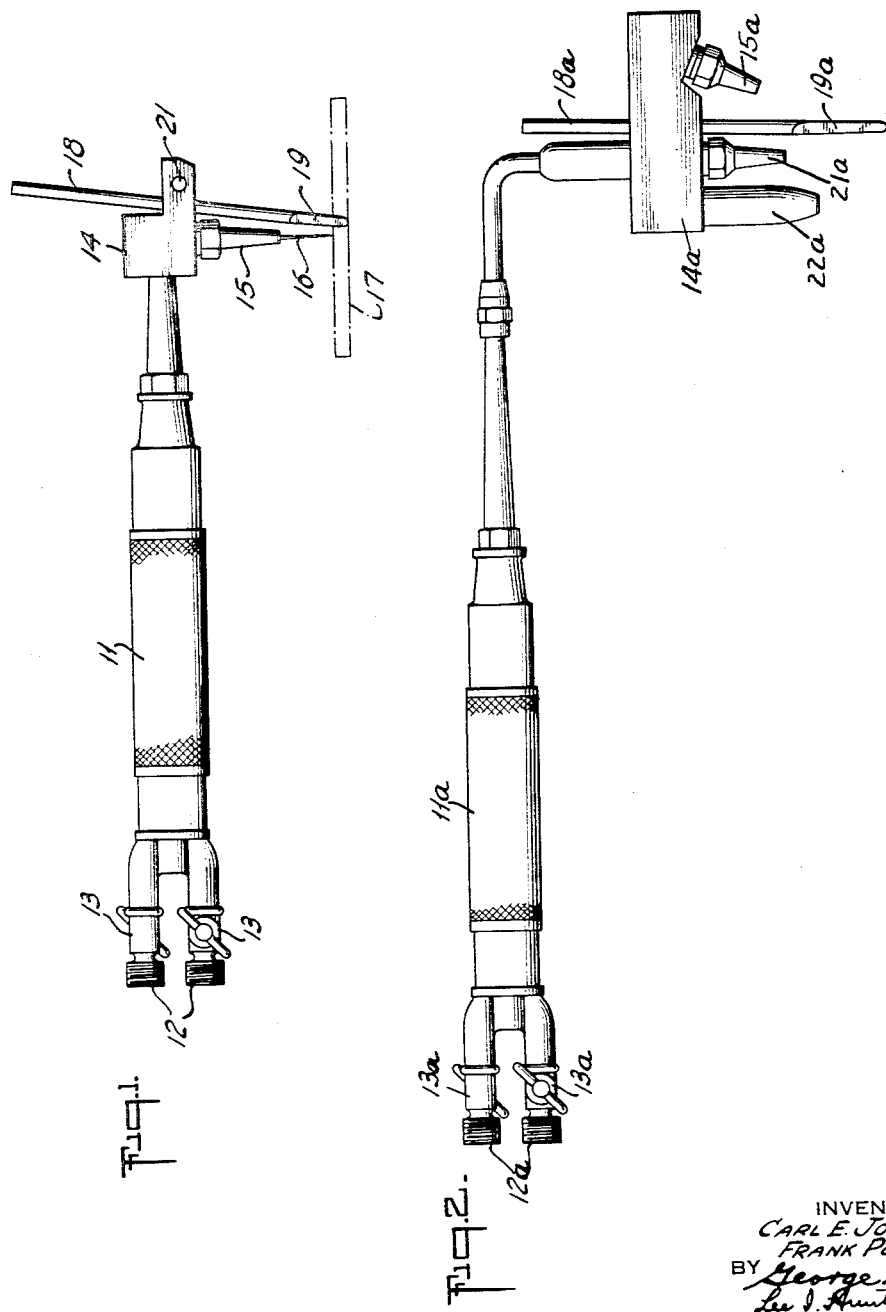
INVENTORS
CARL E. JOHNSON
FRANK PURPURA
BY
ATTORNEYS

United States Patent Office 2,931,263
Patented Apr. 5, 1960

---

2,931,263

METHOD OF CUTTING ALUMINUM INCLUDING THE STEP OF HEATING TO A WHITE HEAT

Carl E. Johnson, West Bridgewater, and
Frank D. Purpura, East Orleans, Mass.

Application October 11, 1956, Serial No. 615,435

3 Claims. (Cl. 83—16)

(Granted under Title 35, U.S. Code (1952), sec. 266)

The invention described herein may be manufactured and used by or for the Government of the United States of America for governmental purposes without the payment of any royalties thereon or therefor.

The present invention concerns a hot knife cutting device and method. In particular the invention concerns a hot knife torch and method for cutting aluminum.

An object of the invention is to provide a cutting device.

Another object is to provide a hot knife torch for cutting aluminum.

Another object is to provide a hot knife torch for cutting aluminum by preheating the aluminum almost to the melting point and then cutting with a white hot knife blade.

Another object is to provide a method of cutting aluminum.

Another object is to provide a method for cutting aluminum by projecting a flame against a localized area to preheat the aluminum to a temperature just below the melting point and then cutting the preheated area with a white hot knife blade, and progressively heating successive areas of the aluminum and simultaneously cutting with the white hot blade.

Other objects and many of the attendant advantages of this invention will be readily appreciated as the same becomes better understood by reference to the following detailed description when considered in connection with the accompanying drawing wherein:

Fig. 1 is a side elevational view of a preferred embodiment of the invention, and Fig. 2 is a side elevational view of a modified view of the invention.

Conventional methods for cutting aluminum involves shearing, punching and chipping. These methods are cumbersome and time-consuming and in the cramped space often found aboard ship these methods for cutting aluminum are difficult and sometimes impossible to use.

It is impossible to cut aluminum by flame in the manner in which other metal such as steel is cut. This is because of the fact that aluminum will disintegrate if heated to the melting point to form a puddle in order to initiate flame cutting. Furthermore, even should a very small localized area be successfullw heated to form a puddle, the next step of blasting such puddle with a stream of oxygen will merely have the effect of cooling the aluminum puddle; in contrast the oxygen stream effects the cutting in the case of steel.

The present invention marks a sharp departure from conventional methods of cutting aluminum by shearing, punching, and chipping.

The present invention also overcomes the difficulties that render flame cutting impossible in connection with aluminum.

As seen in Fig. 1, the equipment consists of a standard oxyacetylene welding torch 11 having separate oxygen and acetylene infeeds 12 controlled by valves 13. The end of torch 11 is provided with a head 14 to which is fitted a special substantially vertical tip 15 adapted to project a flame along an axis 16. The flame is adapted to project along axis 16 into impinging contact with a piece of aluminum 17. Also mounted in torch head 14 is a knife 18 having a blade 19 adapted to extend through the workpiece 17 during a cutting operation. Knife 18 extends at an oblique angle with respect to tip 15 and blade 19 is adapted to be heated to white heat by the flame. Knife 18 is adjustably mounted within head 14 so that it can move in the direction of its own axis and thus be advanced or retracted with respect to workpiece 17 and tip 15. Set screw 21 in head 14 locks knife 18 into selected position.

In operation the torch is lit at tip 15 and the flame projects downward. Almost immediately after the torch is lit, the thin tungsten blade 19 reaches white heat from the flame. The flame also heats the aluminum plate 17 almost to the melting point. The white hot blade 19 is then drawn through the soft aluminum 17 with little effort. In order to cut along a line the flame is moved along aluminum 17 to heat successive areas to a temperature just below the melting point and as the flame moves along, white hot blade 19 moves with it cutting the successively heated areas.

In Fig. 2 there is shown a modified form of the invention comprising a standard oxyacetylene welding torch 11a having separate oxygen and acetylene infeeds 12a controlled by valves 13a. The end of torch 11a is provided with a head 14a to which is fitted a special tip 15a adapted to project a flame at an angle to intersect with knife 18a having a blade 19a. A principal purpose of tip 15a is to project a flame that will heat blade 19a to a white heat and tip 15a further serves to preheat the piece of aluminum to be cut (not shown). It is noted that in contrast to the form of invention shown in Fig. 1, knife 18a and blade 19a extend substantially vertically whereas tip 15a is at an oblique angle.

Also provided at head 14a is a second tip 21a which is substantially vertical and adapted to project a flame against the aluminum to be cut just ahead of blade 19a. A third tip 22a which is also substantially vertical is provided to project a flame into contact with the aluminum to be cut at a position even more advanced from blade 19a than is tip 21a. In operation, tip 15a is lighted first to bring blade 19a to a white heat and to preheat the aluminum at the tip of blade 19a. Flames 21a and 22a are next lighted to preheat the aluminum to be cut in advance of blade 19a. Cutting is performed in a manner similar to cutting with the torch shown in Fig. 1 by moving the flames along the aluminum to be cut to heat successive areas to a temperature just below the melting point and as the flames move along white hot blade 19a moves with them to cut the successively heated areas.

Obviously many modifications and variations of the present invention are possible in the light of the above teachings. It is therefore to be understood that within the scope of the appended claims the invention may be practiced otherwise than as specifically described.

We claim:

1. A device for cutting a piece of aluminum comprising a torch having a head, multiple flame tips mounted on said head for projecting flames against the piece of aluminum in adjacent areas, a knife, and means on said head for adjustably mounting said knife for movement through the flame zone on one tip and along a path oblique to the flame axis of said tip and intersecting the flame axis in the region where the flame meets the piece of aluminum.

2. A method for cutting a piece of aluminum which comprises the steps of projecting a flame against a localized area to heat it to a temperature just below the melting point, heating a knife blade to white heat, and cutting the aluminum in the heated localized area at a temperature just below the melting point with the knife blade at white heat.

3. A method for cutting a piece of aluminum which comprises the steps of projecting multiple flames against localized and adjacent areas to heat them to a temperature just below the melting point, heating a knife blade to white heat, cutting the aluminum in the heated areas just below the melting point with the knife blade at white heat, moving the flames along the aluminum to heat successive areas to a temperature just below the melting point, continually heating the knife blade at white heat, and moving the knife blade with the flames along the aluminum to cut successive areas.

References Cited in the file of this patent
UNITED STATES PATENTS

| | | |
|---|---|---|
| 2,235,532 | Reardon | Mar. 18, 1941 |
| 2,358,772 | Brow et al. | Sept. 16, 1944 |